J. F. WANDERSEE.
METHOD OF HARDENING OR TEMPERING CAM SHAFTS.
APPLICATION FILED JAN. 2, 1920.
1,376,984.
Patented May 3, 1921.
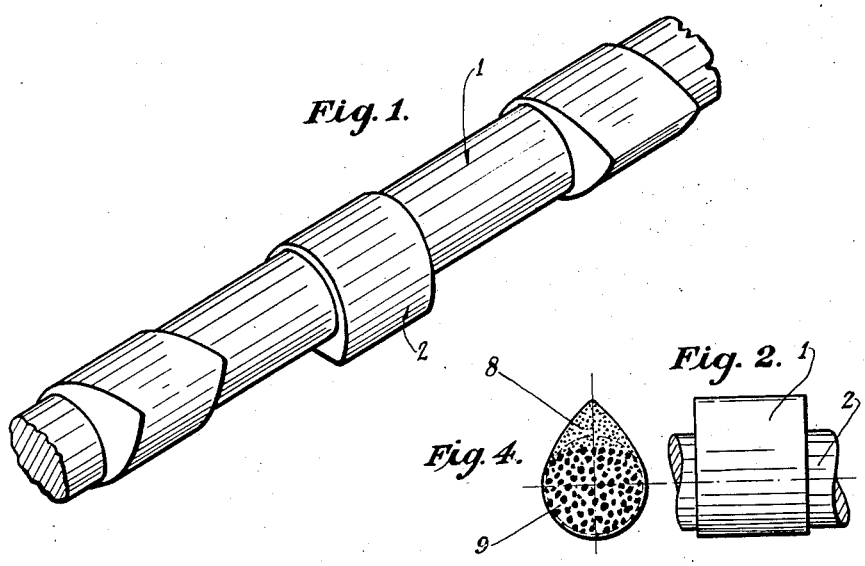
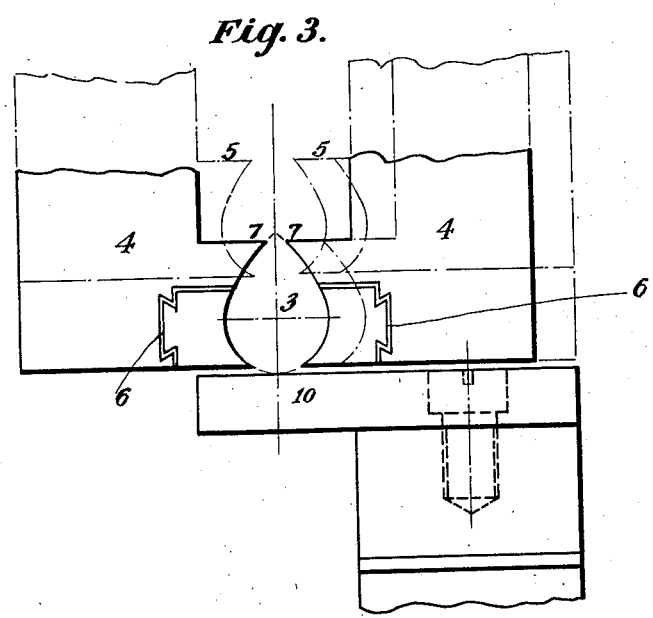

UNITED STATES PATENT OFFICE.

JOHN F. WANDERSEE, OF HIGHLAND PARK, MICHIGAN, ASSIGNOR TO FORD MOTOR COMPANY, OF DETROIT, MICHIGAN, A CORPORATION OF MICHIGAN.

METHOD OF HARDENING OR TEMPERING CAM-SHAFTS.

1,376,984.

Specification of Letters Patent.

Patented May 3, 1921.

Application filed January 2, 1920. Serial No. 348,815.

*To all whom it may concern:*

Be it known that I, JOHN F. WANDERSEE, a citizen of the United States of America, residing at Highland Park, in the county of Wayne and State of Michigan, have invented certain new and useful Improvements in the Method of Hardening or Tempering Cam-Shafts, of which the following is a specification, reference being had thereto in the accompanying drawings.

My invention relates to the art of producing cam shafts the cams of which are very hard and the shafts of which are relatively soft and tough.

Among the objects of my invention is that of producing a cam shaft, the shaft of which is tough and at the same time easily straightened when bent, and the cams of which are relatively hard so as to withstand the wear of constant use required of them.

The method heretofore employed of accomplishing this result has been to treat the metal by carbonizing and cyaniding treatments in ovens. This requires considerable time to produce a single cam shaft—in some cases about an entire day—and for large production involves a large number of ovens, which are expensive and require a great amount of space, with a correspondingly large expense for the operation and maintenance of the same.

To accomplish my invention I take the ordinary forged cam shaft made of high carbon steel and, as is herein shown for illustration, place the same in an ordinary electric welding machine with the cam itself held between two electrodes, apply electrical heating current to the said cam until it attains the desired temperature, then remove the shaft from the machine and quench it.

To better illustrate my invention in connection with the particular means which I will hereafter describe for heating the cam I have made drawings, and referring more particularly to the same, Figure 1 is a view of part of the cam shaft showing three of the cams; Fig. 2 is a view of a single cam located on a shaft; Fig. 3 is a front view of the means of holding the cam in the welding or similar machine for heating the same; Fig. 4 is an end view of a cam on a shaft which has been cut through the middle so as to show that part which is hardened or tempered and that part which remains relatively soft and tough.

The cam shaft 1 with the cam 2 thereon is placed in the opening 3 formed by the jaws 4, which jaws are connected with electric current which may be turned on or off at will. These jaws may be moved together or apart laterally or vertically by means of levers, which are not shown. The lower portion of the shaft lies on a rest 10 which may or may not be insulated. The light lines 5 in Fig. 3 show the jaws in a raised position. The jaws are insulated at 6 so that when an electric heating current is passed through them it does not reach the shaft portion of the cam shaft in the lower part of opening 3.

Inasmuch as these jaws act as electrodes for conducting electric current they are preferably made of copper. That part of the jaw between the insulation 6 and the opening 3 may also be of any material. I prefer steel because of its greater wearing properties.

Having thus placed the cam shaft in the welding or other similar machine with the cam held securely between the jaws 4, I transmit an electric current through the jaws, which are acting as electrodes, to the cam covering that portion between the insulation 6 to points 7 of the jaws, allowing the current to remain on until the cam has been heated to the desired temperature, which may vary to a greater or lesser extent. For the purposes for which I have used this process I have found about fourteen hundred fifty (1450) degrees, Fahrenheit, to be the best heat.

Then throwing off the current I remove the cam shaft from the machine and quench the heated portion. This leaves the cam portion very hard and the shaft portion in substantially the same degree of hardness as before the treatment, except for a very small portion thereof next to the cam. This is more particularly illustrated by Fig. 4, in which the soft portion is illustrated by numeral 9 and the hard portion by numeral 8.

I wish it understood that in speaking of "the cam portion" for the purpose of this application, I mean that part of a cam shaft as shown by numeral 8, Fig. 4, and none of that portion shown by 9, the outer part of which might ordinarily be termed part of a cam.

I do not limit myself, however, to this method of heating the cam, as special machines or other means may be used for securing the desired heat in the desired place.

What I claim is:

1. A method of hardening or tempering camshafts which consists in placing the shaft between movable electrodes adapted to be clamped against the cams so as to hold the shaft securely while being operated upon, applying a heating current through said electrodes until said cams have attained the desired temperature, then quenching the same.

2. A method of hardening or tempering camshafts which consists in placing such portion thereof as it is desired to harden or temper, between electrodes, applying electrical heating current thereto until the cam portion has attained a heat of between one thousand and two thousand degrees Fahrenheit, and then quenching the same.

3. The method of hardening or tempering cam shafts which consists in placing such portion thereof as it is desired to harden or temper between electrodes, applying electrical heating current thereto until the cam portion has attained a heat of approximately fourteen hundred fifty (1450) degrees, Fahrenheit, and then quenching the same.

4. A method of hardening or tempering metal which consists in placing such portion thereof as it is desired to harden or temper, between electrodes, applying electrical heating current thereto until the said portion has attained a heat of between one thousand and two thousand degrees Fahrenheit, and then quenching the same.

In testimony whereof I affix my signature in the presence of two witnesses.

JOHN F. WANDERSEE.

Witnesses:
 JAMES J. NOLAN,
 RICHARD J. CORNELL.